(12) United States Patent
Finkelstein et al.

(10) Patent No.: US 9,863,143 B2
(45) Date of Patent: Jan. 9, 2018

(54) PANEL FASTENERS

(71) Applicant: Kason Industries, Inc., Newnan, GA (US)

(72) Inventors: Burl M. Finkelstein, Newnan, GA (US); Brett A. Mitchell, Newnan, GA (US)

(73) Assignee: Kason Industries, Inc., Newnan, GA (US)

( * ) Notice: Subject to any disclaimer, the term of this patent is extended or adjusted under 35 U.S.C. 154(b) by 0 days.

(21) Appl. No.: 15/370,719

(22) Filed: Dec. 6, 2016

(65) Prior Publication Data

US 2017/0081848 A1 Mar. 23, 2017

Related U.S. Application Data

(63) Continuation-in-part of application No. 14/599,196, filed on Jan. 16, 2015, now abandoned.

(51) Int. Cl.

| E04B 1/41 | (2006.01) |
|---|---|
| F16B 5/00 | (2006.01) |
| E04B 2/72 | (2006.01) |
| E05C 19/12 | (2006.01) |
| E04B 1/61 | (2006.01) |
| F25D 23/06 | (2006.01) |
| F25D 13/00 | (2006.01) |

(52) U.S. Cl.
CPC ............... *E04B 2/721* (2013.01); *E04B 1/61* (2013.01); *E04B 1/6183* (2013.01); *E05C 19/12* (2013.01); *F25D 13/00* (2013.01); *F25D 23/063* (2013.01); *F25D 23/067* (2013.01); *F16B 5/0092* (2013.01)

(58) Field of Classification Search
CPC .. E04B 1/6183; E04B 1/6116; E05B 65/0817; E05B 65/0829; Y10T 292/0915; Y10T 292/0947; E05C 19/12; F16B 5/0092
See application file for complete search history.

(56) References Cited

U.S. PATENT DOCUMENTS

| 3,191,244 | A | * | 6/1965 | Burke | ................. E05B 65/0817 292/111 |
|---|---|---|---|---|---|
| 3,472,545 | A | * | 10/1969 | Berkowitz | ............ E04B 1/6183 292/111 |
| 3,661,410 | A | * | 5/1972 | Larson | ................. E05B 65/0817 292/111 |
| 4,020,613 | A | * | 5/1977 | Reynolds | ............ E05B 65/0817 403/321 |

(Continued)

*Primary Examiner* — Christine T Cajilig
(74) *Attorney, Agent, or Firm* — Baker, Donelson, Bearman, Caldwell & Berkowitz, PC; Dorian Kennedy

(57) ABSTRACT

A panel fastener (20) is disclosed having a hook and cam assembly (21). The fastener has a metallic casing 23 comprised of two sidewalls (24) formed with a boss (27') inwardly indented from the main sidewall portion through which a cam shaft (28) is journaled. The boss (27') is formed as a circular or annular recess or depression having an inwardly extending boss sidewall 51 extending inwardly from the sidewalls (24) and extending to an end portion or end wall (52) having a cylindrical terminal end or bearing surface (53). The bearing surface is located along a cylinder substantially coaxially aligned with the cam shaft and substantially normal to the plane (55) of the outer surface of the adjacent portion of the casing sidewall.

8 Claims, 3 Drawing Sheets

(56) References Cited

U.S. PATENT DOCUMENTS

| | | | | | |
|---|---|---|---|---|---|
| 4,417,430 | A | * | 11/1983 | Loikitz | E04B 1/6183 292/111 |
| 4,512,122 | A | * | 4/1985 | Berkowitz | E04B 1/6183 29/453 |
| 5,452,925 | A | * | 9/1995 | Huang | E05B 65/0817 292/57 |
| 6,299,224 | B1 | * | 10/2001 | Finkelstein | E04B 1/6183 292/240 |
| 6,681,471 | B1 | * | 1/2004 | Finkelstein | E05C 3/045 29/438 |
| 2006/0249960 | A1 | * | 11/2006 | Wilder | E05B 15/022 292/340 |
| 2012/0311824 | A1 | * | 12/2012 | Mulholland | F16G 11/106 24/301 |

* cited by examiner

PANEL FASTENERS

REFERENCE TO RELATED APPLICATION

This is a continuation-in-part of U.S. patent application Ser. No. 14/599,196 filed Jan. 16, 2015 and entitled PANEL FASTENERS.

TECHNICAL FIELD

This invention relates generally to panel fasteners which are used to fasten large insulated panels together in constructing the walls, floors and ceilings of refrigerated spaces.

BACKGROUND OF THE INVENTION

Commercial walk-in coolers, like those commonly found in convenience stores and commercial food storage facilities such as supermarkets, are typically constructed of insulating wall, ceiling and floor panels that are fastened snugly together. The panel ends are shaped to fit together in tongue and groove fashion and are provided with latch type fasteners for drawing and holding adjacent panels together. The latches themselves commonly comprise a hook and cam assembly that is mounted to one panel for latching engagement with a pin that is mounted to an adjacent panel.

There are two main types of panel fasteners, nail-in-place and winged. Both types have a casing with two sidewalls formed with an annular opening defined by a boss with a curved lip. The fastener has a cam with a shaft journaled in the boss and a hook mounted in camming engagement with it. Examples of these fasteners are shown in U.S. Pat. Nos. 3,784,240 and 3,671,006, respectively.

However, the curved lip of these bosses renders the casing more susceptible to spreading in the area about the boss. As the hook engages the pin and pulls it, the cam shaft exerts a force on the side of the boss nearer to the pin. As a result, the cam shaft may ride upon the curved surface of the lip and exert a spreading force on the casing.

This tendency for the casing to spread or bulge is even greater when the latch and pin are misaligned. Winged fasteners are usually mounted by being foamed in place using methods similar to the one shown in U.S. Pat. No. 5,212,924. Foam is injected inside the panel. As it hardens the fasteners become secured in place. Foam hardening often causes the casing of the hook to cock out of mutual alignment. As a result, when the hook engages the pin and pulls on it, the cam shaft pushes against the front of a casing sidewall and spreads the hook assembly casing walls apart. The force exerted by the hook on the casing sidewall, in combination with the funneling action of the boss, can even cause one side of the cam shaft to pull out of the boss opening and the fastener to malfunction.

The nail-in fastener hook assembly casings also often spread or bulge even though they are mounted to boards usually made of hardened foam. Foam boards are used because they provide good insulation, are inexpensive to manufacture, and are resistant to rotting and water damage. Upon fastening a nail-in panel fastener hook with a pin, the force on the hook often causes the foam board to be crushed or crinkled. This is attributable to the foam board lacking strength sufficient to resist spreading of the metallic walls of the casing. This crushing or crinkling of the foam board often enables the back of the casing to move closer together and the front portion to spread apart. The giving way of the foam board, in combination with the force of the cam shaft against the boss, can easily result in the casing walls spreading significantly. Indeed, the cam shaft may actually become dislodged from the boss resulting in the fastener malfunctioning. This problem is also attributed to large pulling forces placed upon joined fasteners, such as the occurrence of a large wind event on stand alone cold rooms residing outside a supporting structure.

It thus is seen that a need has long existed for a panel fastener hook and cam assembly that is resistant to damage caused during fastening to a complimentary pin assembly or large pulling forces therebetween. Accordingly, it is to the provision of such that this invention is primarily directed.

BRIEF DESCRIPTION OF THE DRAWINGS

FIG. 4 is a cross sectional view of a nail-type panel fastener of FIG. 1, while

SUMMARY OF THE INVENTION

A panel fastener comprising a casing having two oppositely disposed sidewalls wherein each sidewall has a sidewall portion and an inwardly indented boss with a generally circular central opening defined by a bearing surface inwardly recessed from the sidewall portion. The panel fastener also includes a cam, a cam shaft coupled to the cam and having an exterior surface longitudinally oriented generally parallel with the boss bearing surface, and a hook adapted to engage the cam.

DETAILED DESCRIPTION

Figure 1:
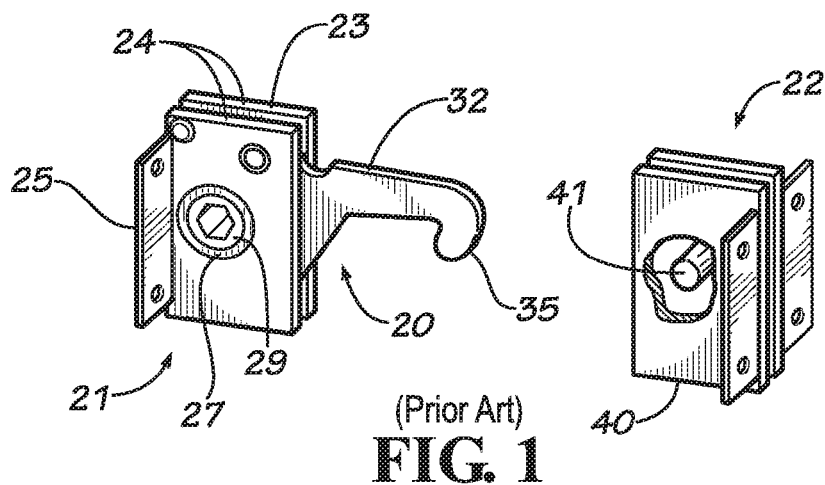
FIG. 1 is a perspective view of a nail-in type panel fastener with its hook assembly shown disengaged form its complimentary pin assembly of conventional construction.
Figure 2:
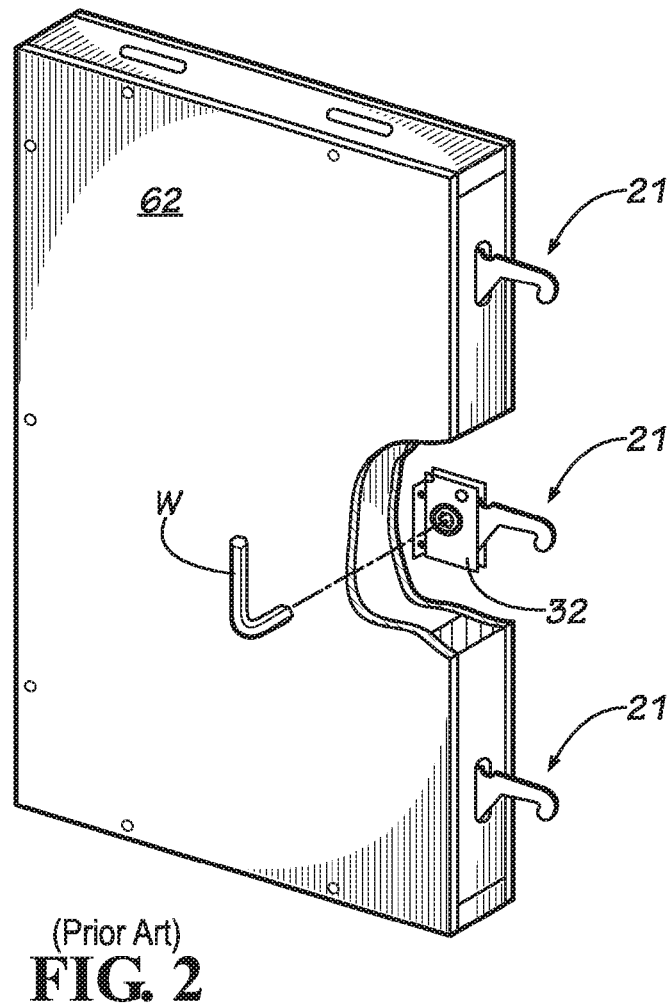
FIG. 2 shows three of the nail-in panel fasteners of FIG. 1 mounted to a board type panel.
Figure 3:
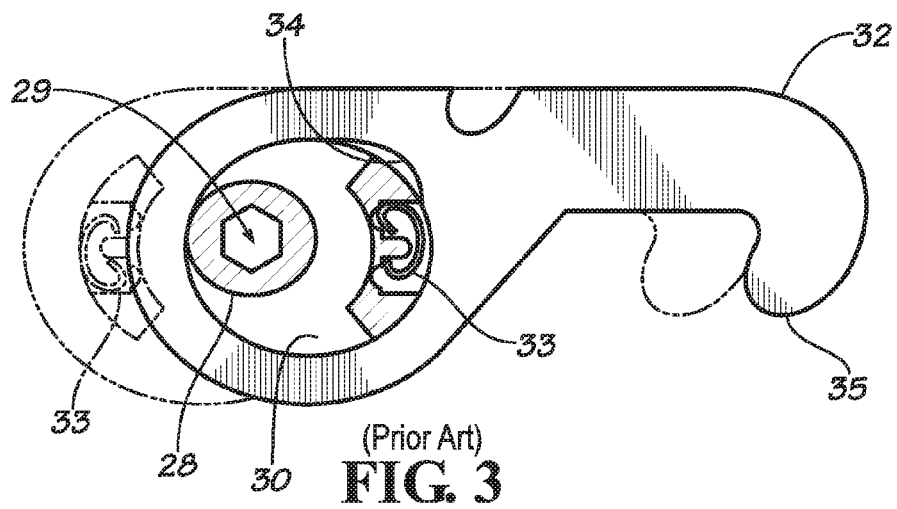
FIG. 3 is a side view of a portion of the hook and cam assembly of the fastener of FIG. 1.

With reference next to the drawings, there is shown in FIGS. 1-5 a conventional nail-in type panel fastener 20, although the present invention may also be utilized in wing type panel fasteners. The fastener has a hook and cam assembly 21 and a pin assembly 22. The hook and cam assembly has a metallic casing 23 comprised of two sidewalls 24 joined together and has two coplanar mounting flanges 25 with holes through which nails or screws may be driven into a panel. The fasteners are mounted to panels 62 as shown in FIG. 2 that have solid frames formed with slots in which the fastener hooks and cam assemblies are mounted. Each sidewall 24 is formed with a boss 27 inwardly indented from the main sidewall portion or majority through which a cam shaft 28 is journaled. The cam shaft is formed with a socket 29 in which a hand wrench w may be inserted as shown in FIG. 2. The cam shaft protrudes from each side of a disc-shaped cam 30. A hook 32 is mounted in camming engagement with the cam. As best shown in FIG. 3, a C-shaped leaf spring 33 is mounted to the cam in frictional engagement with an inner wall 34 of the hook 32. The catch end 35 of the hook extends out of the casing.

The pin assembly 22 is of similar construction. It too has a metallic casing 40 to which a pin 41 is mounted that bridges two sidewalls of the casing. The pin assembly 22 is foamed in place in a panel in catching alignment with the hook of a hook and cam assembly 21 that has been foamed in place in an adjacent panel.

In securing two adjacent panels together the hook 32 is rotated with a wrench w which brings its hook or shank 32 into a position atop the pin. Further rotation of the wrench cams the hook laterally to the position shown in broken lines in FIG. 3. In doing this the catch end 35 of the hook engages the pin and then pulls it and the panel to which it is mounted snugly against the panel from which the hook extends.

Figure 4:
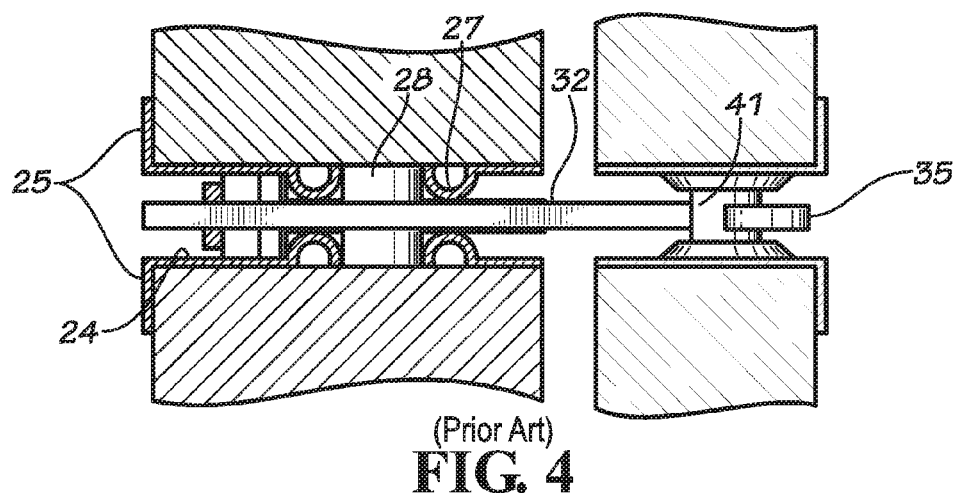
Figure 5:
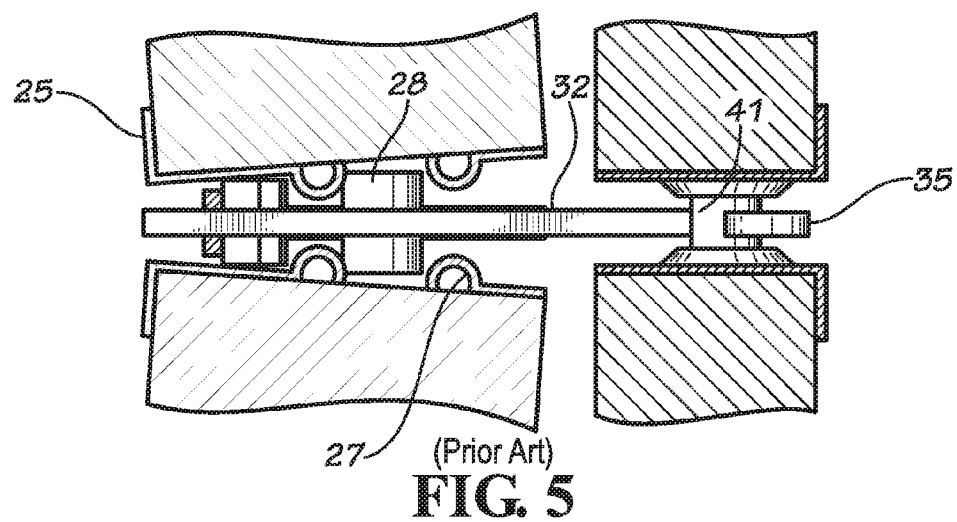
FIG. 5 shows the same fastener with its bosses and adjacent casing spread apart with its cam riding upon the bosses.

A common problem heretofore had with these fasteners is shown in FIGS. 4 and 5. In FIG. 4 the hook is shown aligned properly at a right angle to the casing with the cam shaft 28 extending coaxially with the axes of the two bosses 27. FIG. 5 however shows the result of the hook 32 having engaged and pulled a pin that was misaligned with the hook or wherein too large a force has been placed upon the joined fasteners, such as a wind force acting upon the panels. As a result the hook becomes cocked with respect to its casing and bosses as shown in FIG. 5. The extent of this misalignment and/or pulling force is such that it can result in the cam shaft riding upon the curved interior surface of the boss facing the cam shaft. As the cam shaft is forced in a direction towards the joined pin the movement of the cam shaft upon the curved interior surface of the boss forces the two sidewalls 24 apart from each other. In the end, the cam shaft 28 can actually become dislodged from the bosses. This results in the panels not being fastened snugly together or separated entirely from each other, at least in the area about this fastener.

Figure 6:
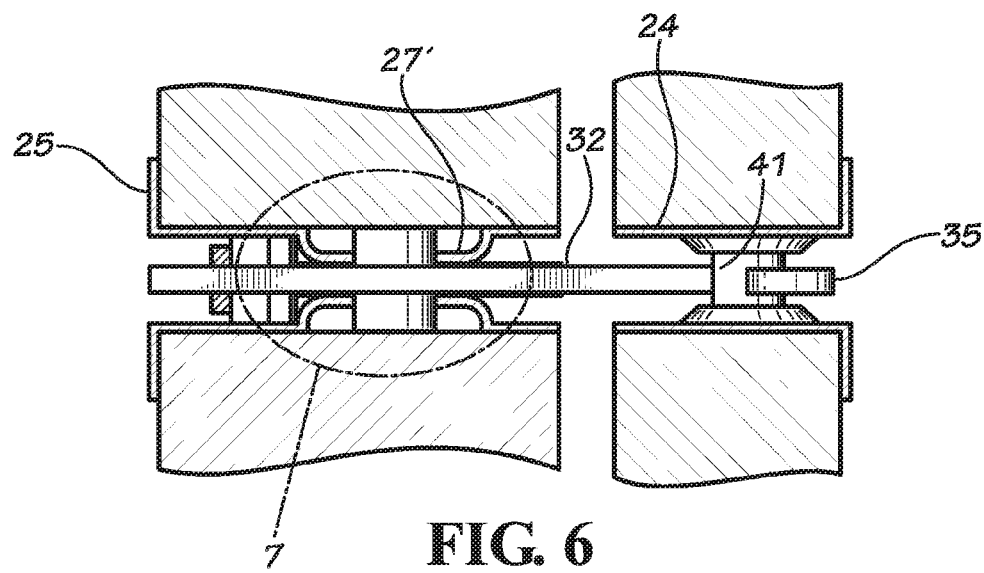
FIG. 6 is a cross sectional view of a nail-in type panel fastener that embodies principles of the present invention.
Figure 7:
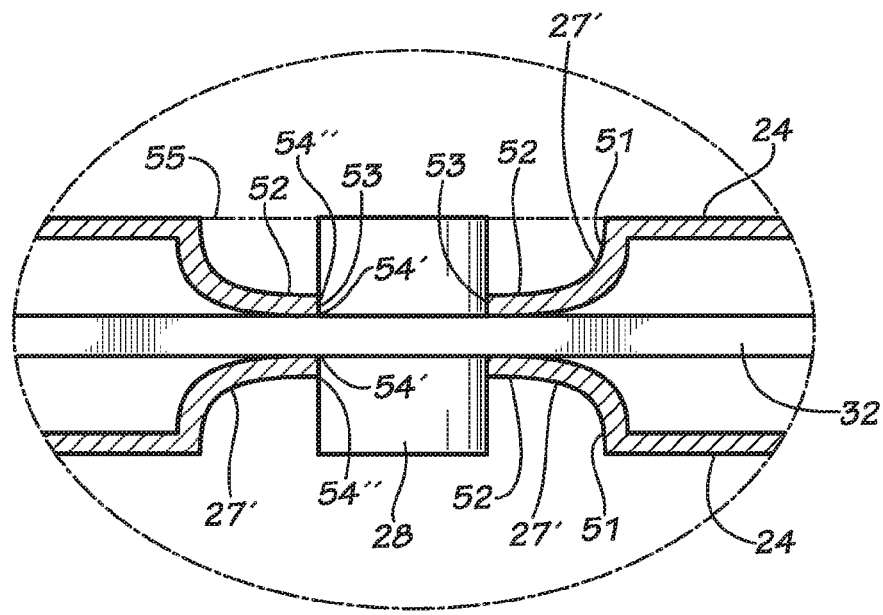
FIG. 7 is an enlargement of a portion of the panel fastener of FIG. 6.

This problem is basically solved by the new boss configuration shown in FIGS. 6 and 7. Here it is seen that the boss 27' is formed as a circular or annular recess or depression having an inwardly extending boss sidewall 51 extending inwardly from the sidewalls 24 and extending to an end portion or end wall 52 having a cylindrical terminal end, end surface, end wall or bearing surface 53. As such, it has an outer annular wall (boss sidewall 51) and an inner annular wall including the terminal bearing surface 53 with inboard corner or edge 54' and outboard corner or edge 54", wherein the end wall or bearing surface 53 is located along a cylinder substantially coaxially aligned with the cam shaft and substantially normal to the plane 55 of the outer surface of the adjacent portion of the casing sidewall 24. The terminal end or bearing surface 53 and its corners or edges 54' and 54" thus extend generally parallel to the curved outer surface of the cam shaft along its longitudinal length. The bearing surface 53 may also be thought of as being oriented generally concentrically oriented about the circular outer surface of the cam shaft or at least a portion of the cam shaft journaled within the bosses.

With the boss bearing outboard edge 54" recessed together with the cam shaft 28 extending beyond the bosses, any cocking or major pulling of the hook, cam and cam shaft is resisted by the bearing surface edges 54' and 54". Should the cam shaft exert a cocking force or large pulling force on the boss, the bearing surface edges of the boss abutting the cam shaft counteract by biting or edging into the shaft and binding the cam shaft on both sides of the cam. The cam shaft may be made of a metal such as zinc which has a metallic hardness softer than the metallic hardness of the steel sidewall bosses to increase the biting effect of the lip edges into the cam shaft surface. As pressure it placed upon the hook that would cause the sidewalls and their bosses to spread apart the inboard corner or edge 54' and/or outboard corner or edge 54" will cut into the softer metal of the cam and thereby form a seat or groove within the cam which will prevent the spreading of the sidewalls relative to the cam. As the sidewalls 24 spread apart from each other the inboard edge 54' of the bearing surface 53 closest the hook or largest spreading of the sidewalls digs into the cam while the outboard edge 54" of the bearing surface 53 distal the hook or largest spreading of the sidewalls digs into the opposite side of the cam. Thus, the sidewalls dig into and notch or groove two different areas of the cam exterior surface to provide maximum grip and a halt to the spreading of the sidewalls. This is very different from the prior art round bosses wherein the cam may ride upon the curved surface of the boss causing further spreading of the sidewalls 24, also know as the ramp effect. As a result of the present invention, the sidewalls 24 do not move relative to the cam shaft 28 and the sidewalls are thereby restricted from spreading apart from each other, i.e., the cam shaft is forced to maintain axial alignment with the bosses which in turn avoids bulging and spreading of the casing sidewalls about the bosses. This concept is also unique because it is typically desired to maintain a smooth surface on the cam rather than scaring the cam, while in the present invention the different hardnesses of the sidewall and cam is specifically designed to scar, etch, notch or groove the cam upon initial spreading in order to prevent further spreading.

It should be noted that the present invention is also an improvement over the modification of the prior art bosses shown in U.S. Pat. No. 6,299,224. There, the modification over the prior art was that the bosses do not continue to a position along the plane 55 of the sidewalls. However, the bosses still include a curved inner wall, albeit shorter in length, which may cause spreading of the sidewalls should the cam commence to ride upon the inner walls under force, as the bearing surface is oriented parallel to the sidewalls and generally normal to the axis of the cam shaft.

It should be noted that the indenting or recessing of the boss 27 places the end wall or bearing surface 53 closer to the centerline of the cam shaft 28 and hook 32. The closer the end walls or bearing surfaces 53 are to the centerline the closer the load bearing point between the sidewalls 24 (housing) and the cam which minimizes asymmetric loading upon the sidewalls (housing) which may cause spreading of the sidewalls.

It should also be noted that the boss is formed from an indentation having an arcuate boss sidewall 51 wherein the bearing surface 53 is set at or very close to the termination of the arc, i.e. the boss is indented along an arcuate boss sidewall 51 with a curvature that terminates generally at the terminal bearing surface 53. Thus, by limiting or eliminating the straight length of the end wall 52 the boss has a very strong and rigid construction to limit wobbling, flexing or twisting of the end wall. This is very different from the extended length of the straight boss end wall shown in the prior art U.S. Pat. No. 4,020,613 wherein the straight end wall extends longer than the cam (eccentric 12) itself.

It thus is seen that a new panel fastener hook and cam assembly is provided that overcomes the problem of casing buckling or spreading. Although the new assembly has been shown in its preferred form, many modifications, additions and deletions may be made thereto without departure from the spirit and scope of the invention as set forth in the following claims.

The invention claimed is:
1. A panel fastener comprising,
a casing having two oppositely disposed sidewalls made of a first metal having a first metallic hardness, each said sidewall having a sidewall portion and an inwardly indented boss with a generally circular central opening defined by a generally straight end wall portion having a terminal bearing surface inwardly recessed from said sidewall portion;

a cam;

a cam shaft coupled to said cam and made of a second metal having a second metallic hardness softer than said first metallic hardness of said sidewalls for allowing said terminal bearing surface of said sidewalls to dig into and deform an exterior surface of said cam shaft should the cam shaft become misaligned within said bosses, said cam shaft having an exterior surface longitudinally oriented generally parallel with said boss bearing surface, and a hook adapted to engage said cam and oriented generally parallel with said end wall portion of said bosses so as to abut said end wall portion of said bosses.

2. The panel fastener of claim 1 wherein each said bearing surface of said sidewalls has an inboard edge and an outboard edge, wherein both said inboard edge and said outboard edge abut said cam shaft.

3. The panel fastener of claim 1 wherein each said boss is indented along an arcuate boss sidewall with a curvature that terminates generally at said terminal bearing surface.

4. A panel fastener comprising, a casing having two oppositely disposed sidewalls made of a first metal having a first metallic hardness, each said sidewall being oriented along a sidewall plane, each said sidewall having a boss with a generally circular central opening defined by an end wall having a bearing surface inwardly recessed from said sidewall plane and being oriented generally normal to said sidewall plane;

a cam;

a cam shaft coupled to said cam and mounted within each said boss of said sidewalls generally perpendicular to said end wall and parallel to said bearing surface and made of a second metal having a second metallic hardness softer than said first metallic hardness of said sidewalls for allowing said bearing surface of said sidewalls to dig into and deform an exterior surface of said cam shaft should the cam shaft become misaligned within said bosses, and a hook adapted to engage said cam, said hook being positioned to abut said boss.

5. The panel fastener of claim 4 wherein each said bearing surface of said sidewalls has an inboard edge and an outboard edge, wherein both said inboard edge and said outboard edge abut said cam shaft.

6. The panel fastener of claim 4 wherein each said boss is indented along an arcuate boss sidewall with a curvature that terminates generally at said bearing surface.

7. A panel fastener comprising a casing having two sidewalls each formed with a boss having an outer annular wall that extends from an adjacent planar surface of said casing sidewall and an inner annular wall recessed from said adjacent casing sidewall surface with an end wall portion extending between said outer annular wall and said inner annular wall generally parallel with said sidewalls, said end wall having a terminal bearing surface having an annular inboard edge and an annular outboard edge, wherein said inboard edge and said outboard edge generally abut said cam shaft;

a cam having a cam shaft journaled in said boss inner walls, said cam shaft having at least one cylindrical portion which is coaxially aligned with said cylindrical terminal bearing surface, said camshaft also extending outwardly from said boss inner walls, said cam shaft is made of a metal having a metallic hardness compared to the metallic hardness of said boss inboard edge and said outboard edge which enables said inboard edge or said outboard edge of said end wall to cut into and notch said cam shaft should the cam shaft become misaligned within said bosses, and a hook mounted in camming engagement with said cam.

8. The panel fastener of claim 7 wherein each said boss is indented along an arcuate boss sidewall with a curvature that terminates generally at said terminal bearing surface.

* * * * *